Figure 10:
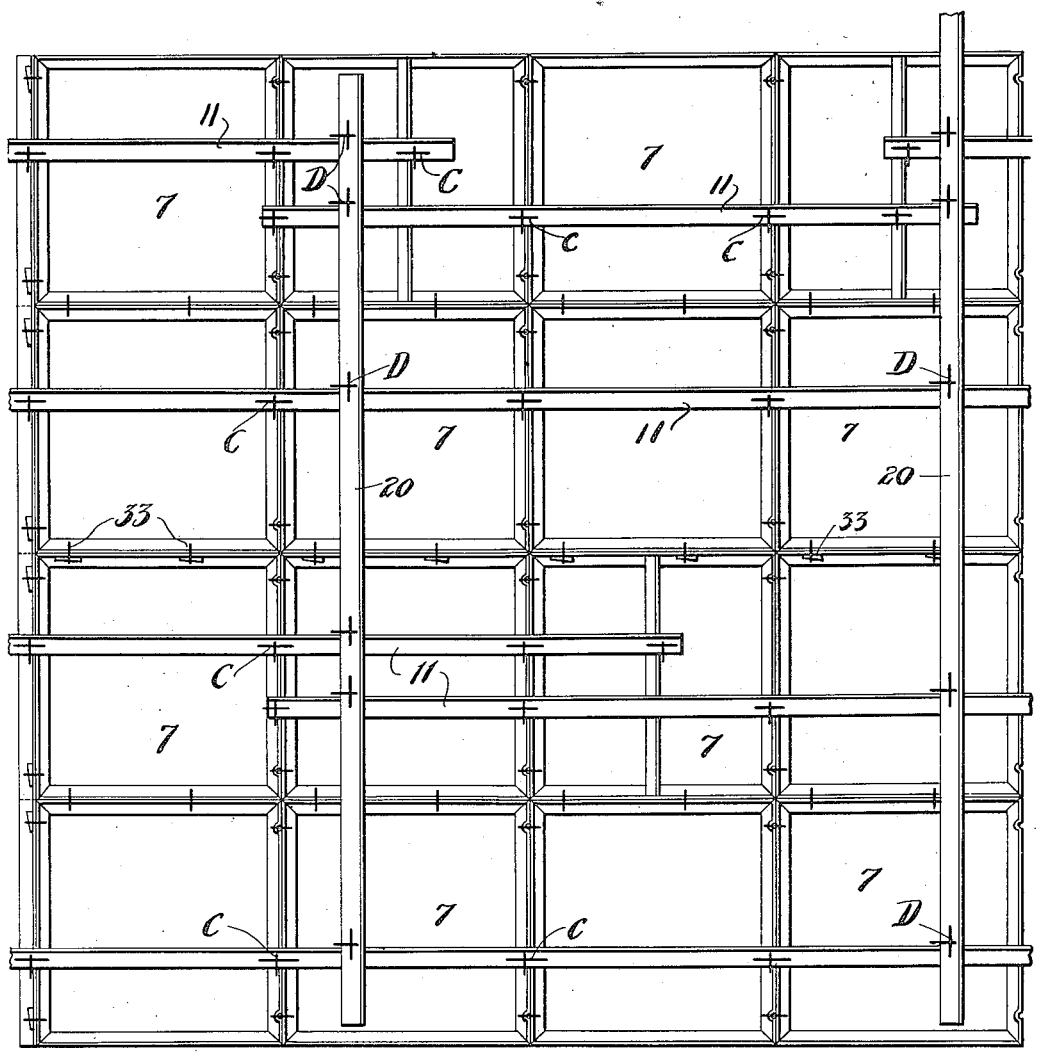

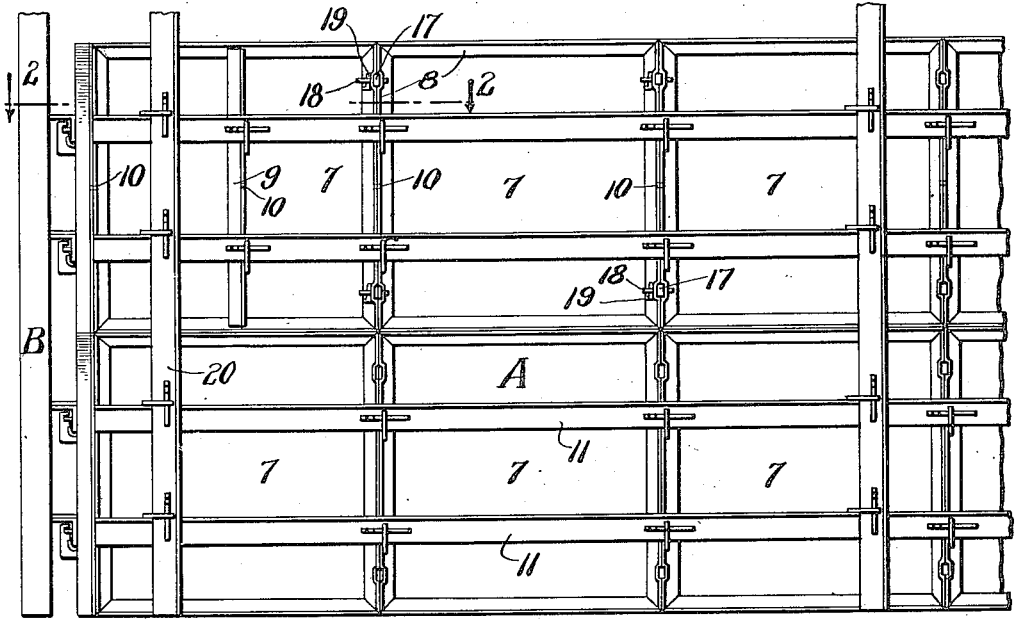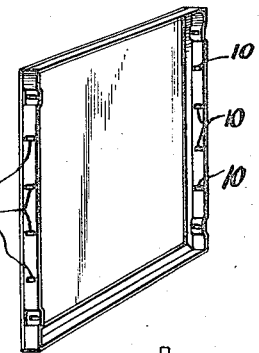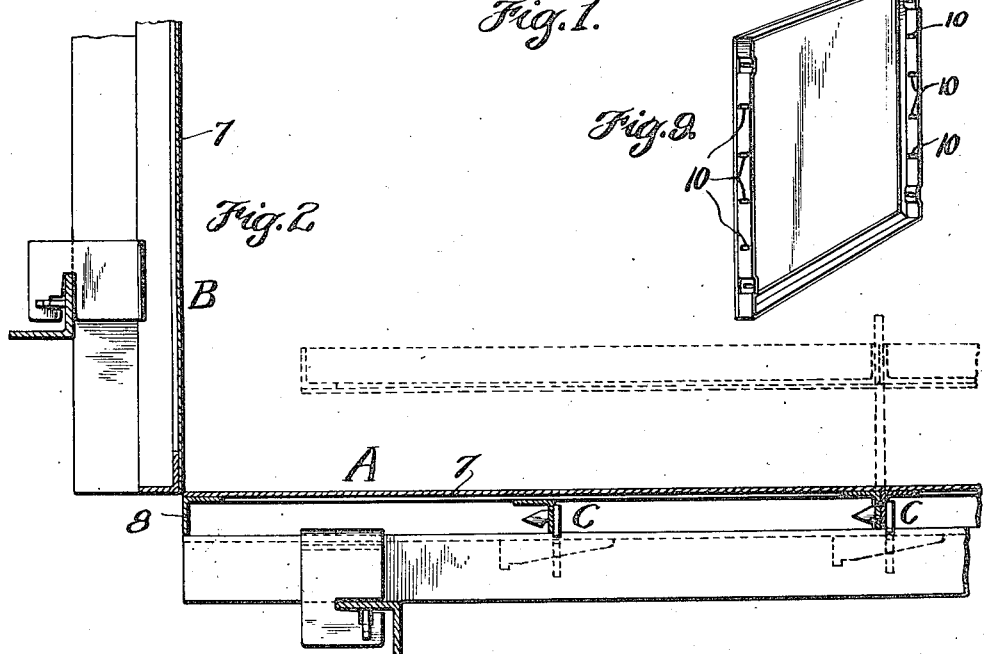

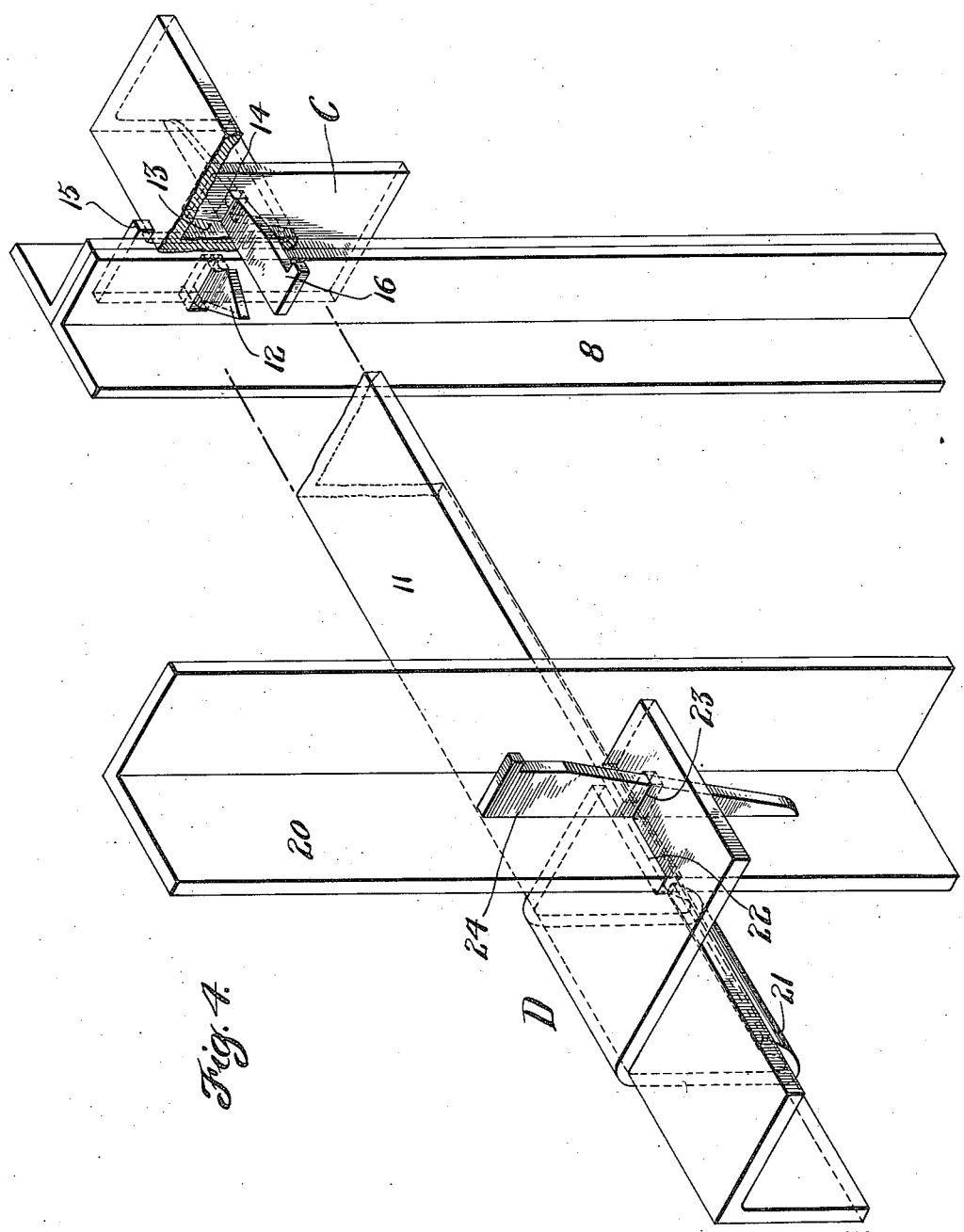

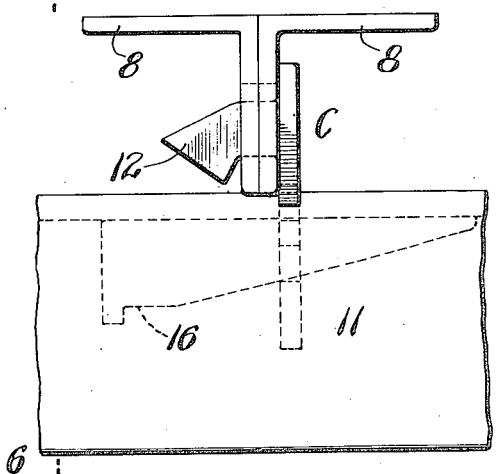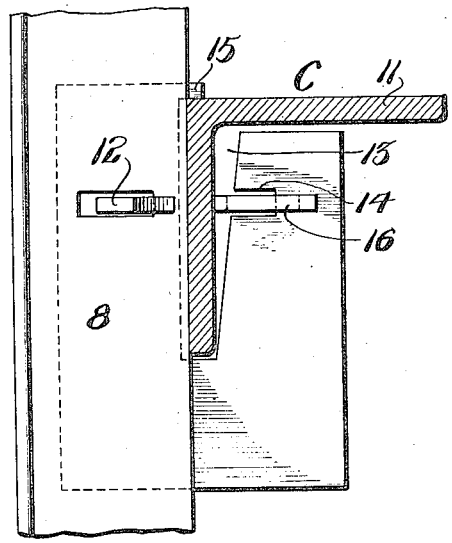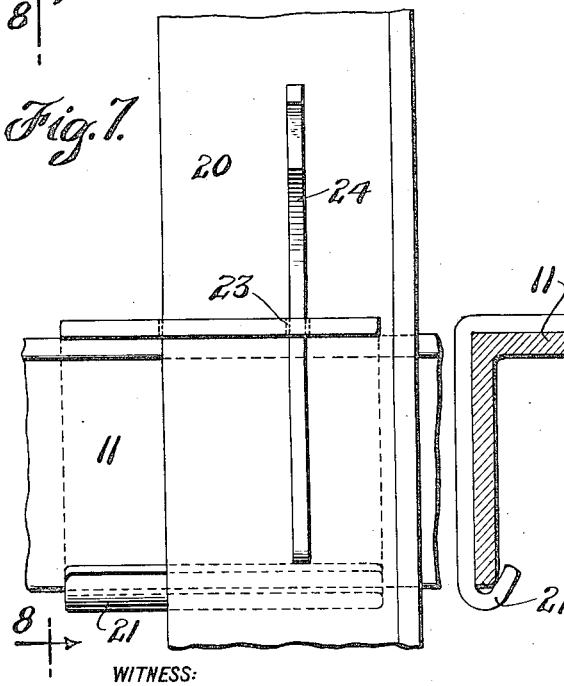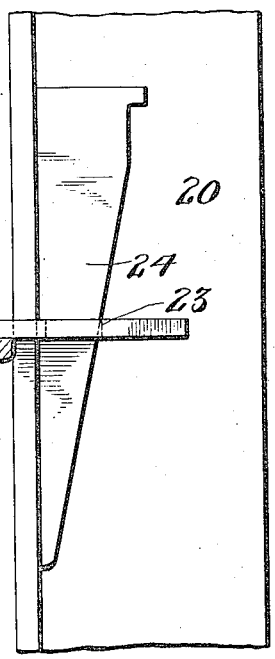

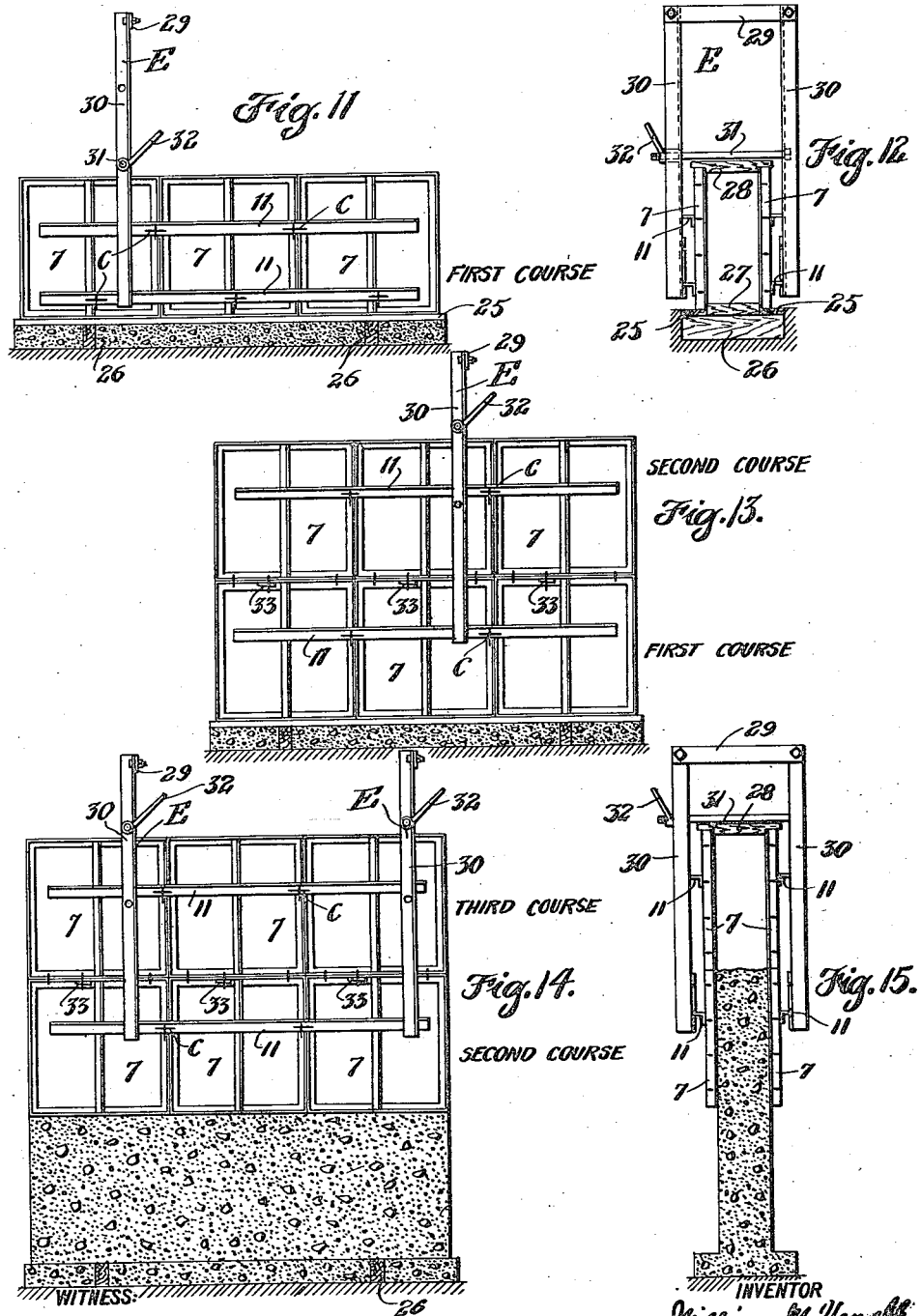

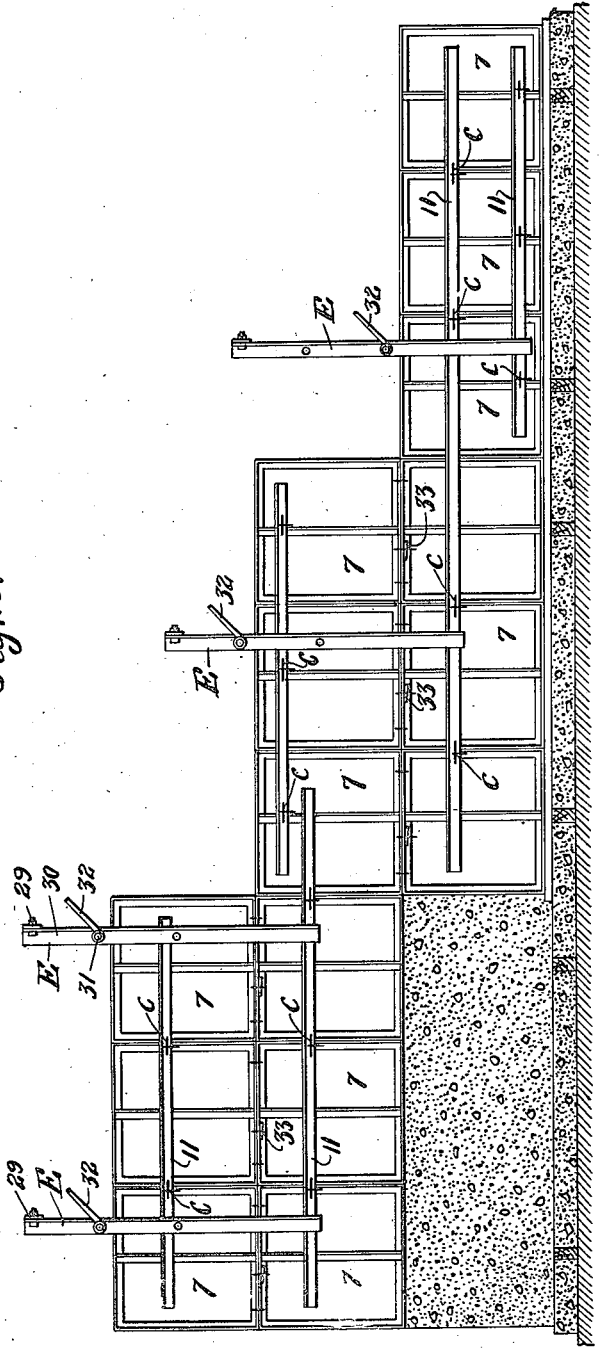

UNITED STATES PATENT OFFICE.

WILLIAM M. VENABLE, OF PITTSBURGH, PENNSYLVANIA, ASSIGNOR TO BLAW-KNOX COMPANY, A CORPORATION OF NEW JERSEY.

MOLD.

1,413,693.   Specification of Letters Patent.   Patented Apr. 25, 1922.

Application filed August 27, 1919. Serial No. 320,151.

*To all whom it may concern:*

Be it known that I, WILLIAM M. VENABLE, a citizen of the United States, residing at Pittsburgh, in the county of Allegheny and State of Pennsylvania, have invented certain new and useful Improvements in Molds, of which the following is a specification.

This invention relates to molds or forms for use in the construction of houses and similar structures from plastic material such as concrete, and it pertains to the general class of apparatus shown for example in Letters Patent of the United States issued to me, respectively numbered 1,103,109 of July 14, 1914 and 1,129,144 of February 23, 1915.

Briefly, the form shown in said Letters Patent comprises panels, liners, spacers, fillers, corners, splices and temporary locking members, all so arranged and constructed that combinations and adjustments may be arrived at, making the equipment applicable to structures of various styles and dimensions within very close limits.

One of the primary objects of the present invention resides in improving such apparatus so as to render the same capable of adaptation to a wider field of usefulness.

Another of the important objects of my invention is the provision of improvements whereby it is practical to shift the panels in units of any size that can be conveniently handled by the facilities available, and whereby the placing and removing of many fastenings or temporary locking elements is avoided; both with a material saving in time and labor.

Still another object of my invention resides in the provision of improved means whereby the amount of necessary "plant" or permanent equipment is greatly reduced, effecting a saving in time, labor and material and reducing the initial plant investment.

My invention also contemplates the provision of improved means whereby any desired number of courses of panels can be used one above the other; whereby the same liner may be used in either horizontal or vertical position; whereby handling of the parts is facilitated and expedited; and whereby the parts may be greatly simplified.

In addition to the foregoing my invention contemplates the provision of improvements in forms of this general character and in supporting means therefor whereby the number of panels required may be greatly reduced and the work accomplished with but a few, units of which may be readily successively shifted, transposed or superimposed as the work progresses.

In the accompanying drawings I have shown only such portions of the preferred form of apparatus as are necessary to an understanding of my invention. Of the drawings—

Figure 1 is a side and end elevation of wall units made in accordance with my invention; Figure 2 is a section taken on the line 2—2 of Figure 1, on an enlarged scale; Figure 3 is a view representing details capable of use in connection with the construction of Figures 1 and 2; Figure 4 is a perspective view showing the manner of securing the panels and horizontal liners together; Figures 5 and 6 are enlarged views illustrating the construction and operation of the horizontal liner and panel ties; Figures 7 and 8 are similar views illustrating the construction and operation of ties utilized in securing the vertical liners to the horizontal liners; Figure 9 is a perspective of a panel; Figure 10 is a diagrammatic fragmentary side elevation illustrating the method of application of liners in lapped relation; Figure 11 is a side elevation illustrating one step in the casting of a wall with but a few panels; Figure 12 is an end elevation of Figure 11; Figures 13 and 14 illustrate additional steps in casting a wall with the apparatus of Figure 11; Figure 15 is an end elevation of Figure 14; and Figure 16 is a side elevation illustrating still another application of my invention.

Referring now to Figure 1, I have illustrated my improvement as applied to the construction of walls, the reference letter A denoting a portion of a wall unit in side elevation, and reference letter B denoting a second unit cooperating with the first to form a corner, it being understood that other units are arranged in opposition thereto, as diagrammatically indicated in Figure 2. As shown the units consist of two courses of panels, 7, supported in the manner to be set forth, such panels consisting of flat plates or webs and a framework of angles 8, the plates and angles being secured together in any preferred manner, as for example by riveting or spot welding. The panels 7 may also be provided with an intermediate reinforcing angle 9, of which one only is shown in Figure 1, for purposes of clarity.

The angles 8 of the panels, in addition to lending rigidity to the panels, serve as securing flanges, for which purpose they are slotted at regular intervals, as at 10 (see Figure 9) so that when a plurality of panels are assembled in a course, the slots 10 will be in alinement. Fasteners may be passed through the slots at any one or more of the four elevations at which the slots occur. Each course of panels is tied together, braced and alined longitudinally by means of one or more liners 11, which may be coextensive with the course in length, i. e. made in a single piece. Or again, several liners may be arranged in lapped relation to make up the desired length, as will further appear.

It is one of the objects of my invention to use the same means employed for fastening adjacent panels together for also fastening the liners in position.

In the preferred embodiment of my invention, such means comprises a combined panel and liner tie, indicated as a whole by the reference letter C. The tie (see Figures 4, 5 and 6) consists of a metallic plate having a laterally projecting tapered hook member 12 so constructed that it may be slipped through slots in adjoining flanges. The tie is also provided with a vertically arranged recess 13 adapted to receive one of the legs of a liner, where the liner takes the form of an angle as shown. By virtue of its hook portion 12, the tie C can be hooked on to and attached sidewise against a mold flange, or detached therefrom, by a mere sidewise movement of the tie with reference to the mold section or panel 7. Likewise, also, the liner 11 can be introduced into the lateral opening of the recess or aperture 13 so as to be embraced by the portion of the tie behind which the recess 13 lies by sidewise movement of the parts with reference to one another in the direction of the mold section webs; and when thus engaged with the tie, the liner can be withdrawn or detached with like facility by a similar movement. While the tie is thus hooked to a mold section, it is, of course, effectively supported therefrom.

The ties are also provided with a second recess or notch 14 opening laterally from the main recess 13; and at the top the tie members are provided with a projection or lip 15, the purpose of which will be hereinafter set forth. It will be seen that the construction of the hook portion 12 of the ties is such that when the ties are drawn away from the face of the panels the flanges will be clamped tightly together and in alinement. This drawing away of the tie from the face of the panel is accomplished by driving a key, such as the wedge member 16, into the recess or notch 14 at the side of the opening 13 remote from the panel webs, the effect of which is to drive the liner 11, tightly against the flanges of the panels and force the tie outwardly away from the panel, whereby it is securely but detachably locked to the flanges. In other words, the insertion and engagement of the key member 16 in the notch 14 of the tie aperture 13 operates to wedge the liner 11 against the mold flanges and to draw the hook means 12 firm on them. In cooperation with the adjacent mold structure and with the member 16, the liner 11 then serves to hold the tie C away from the mold web and to maintain the interlocking engagement of the tie with the mold flanges. Thus the wedge member 16 serves as a common means of tightening and securing the juxtaposed mold flanges, the tie C, and the liner 11 all together. The member 16 prevents displacement of the liner 11 from proper position in the aperture 13; and while the liner is thus forced and held behind the projection 15 at the side of the aperture 13 toward the mold panel webs, sidewise withdrawal of the liner is impossible.

Among the advantages incident to this arrangement, the following may be noted. In the first place, it will be seen that the number of fastening elements or parts is greatly reduced, thereby effecting a saving in permanent plant and greatly facilitating assembling and disassembling with a consequent saving of time and labor. In the next place, the liners can be secured at any desired points of elevation, dependent upon the number of the slots in the flanges of the panels. Again, since it is possible to attach the liners at different elevations the liners may be arranged to lap past one another and consequently the total length of liner employed in building a wall of given length, from corner to corner, does not need to be exactly the same as the length of the wall. Thus two or more liners, the total length of which is greater than the length of the wall may be used merely by attaching one or more of the liners at a different elevation than is used for the rest, the liners being lapped past one another to the amount necessary. The number of sizes or lengths of liners necessary for permanent equipment can therefore be reduced to a minimum; in addition to which, it is to be observed that the labor and time heretofore involved in sorting out the proper lengths of liners for the particular work in hand are eliminated. The foregoing application of the liners is illustrated more or less diagrammatically in Figure 10.

Furthermore, it is to be noted that the liners are connected directly to the panel flanges, independently of any other part of the mechanism, whereas before it was customary to secure the liners to the spacing members utilized in spacing and bracing the opposing units of the wall. As one means for tying or spacing the opposing units, the mechanism shown and described in the aforesaid Letters Patent may be used, such mechanism consisting of ties and keys, the ties being shown at 17, Figure 3, and the keys therefor at 19, Figure 3. The keys are slotted, so as to answer the purpose of either a key or a yoke, at will. Or wires may be used and left in the work. By the improved arrangement described I am enabled to shift connected panels in units of any size that may be conveniently handled by the facilities available, by simply removing the keys that secure the spacing members and hooking up to one or more of the liners. Heretofore, this could not be done because the liners were attached to the spacing means. It will be noted that when a unit is being shifted through the medium of one of the liners, the liner cannot be shifted or pulled out of place by virtue of its engagement with the projection 15 on the liner ties. Units are thus made available for repeated use in different places without the necessity of disassembling.

If only one liner be attached to a row of panels forming a long unit, it may be desirable to connect the panel flanges together at other points than those at which the liner is attached, and this can be done by means of the wedges and yokes described in the aforesaid Letters Patent #1,129,144 or by any equivalent arrangement. In Figure 3 I show a wedge that may also be used as a yoke, eliminating the necessity for two kinds of parts for these functions.

Still another advantage incident to the arrangement is that I am enabled to dispense with the use of liner splices, thus effecting a still further saving in material and labor.

Referring now to those features of my invention having to do with the utilization of more than one course of panels, it will be seen that I have provided a means whereby vertical liners 20 may be readily used to couple two or more courses of panels into a unit and to maintain the courses in proper vertical alinement, which was not provided for in prior constructions. To this end I have provided a special liner tie, indicated as a whole by the reference letter D for securing the vertical liners to the horizontal liners. The liner tie D comprises a plate bent to the shape of an angle having at the laterally extending end a hook portion 21 adapted to hook on to or engage over an edge of a leg of a horizontal liner, the other end or main portion of the tie being adapted to rest upon the top face of the liner. The tie is also provided with a longitudinal slot or recess 22 adapted to receive a leg of a vertical liner and with a notch or recess 23 opening laterally from the recess 22 in which recess a wedge or key 24 is driven to jam the vertical liner against the horizontal liner and at the same time to tightly clamp the tie itself on the horizontal liner. Except that its hook portion 21 is not hooked through a plurality of juxtaposed parts and that no analogue for the projection 15 is shown, the action of the liner tie D corresponds very closely to that of the mold section and liner tie C, and hence need not be further described. The effect of tightening the vertical liners to and keying them tightly against the horizontal liners is to line up the forms in a vertical direction so that any number of courses of panels may be used one above the other with their faces kept in a practically plane surface. In addition, it will be apparent that the structure as a whole will be given great rigidity.

In general the arrangement just described has the advantages of the method of securing the horizontal liners to the panels in that the apparatus is very simple, assembling and disassembling is greatly facilitated, the amount of material necessary for permanent plant or equipment is reduced, the vertical liners may be attached at any desired point and may be arranged in lapped relation with all the advantages incident thereto, and two or more courses of panels may be handled as a unit. Splicing of the vertical liners is also rendered unnecessary and the number of fasteners required to hold the form together is greatly reduced.

As to both constructions it is further to be observed that the same liner may be used in either the horizontal or vertical position and it is unnecessary to perforate the liners for the attaching of spacer means or for splices as heretofore required. It is to be understood that while I have shown my invention as applied to a construction of panels with plane surfaces, it is not limited to such arrangement.

It will be seen from the foregoing that my present improvements adapt themselves very readily to the apparatus shown and described in the aforesaid Letters Patent, but it is to be understood the invention is not limited to such application.

The method whereby I am enabled to construct a wall, for example, with a minimum number of panels or panel units will be described, attention being directed to Figures 11 to 15 inclusive, in which this application of my invention is illustrated. The opposing mold sections may be composed of units comprising any desired number of panels, three panels being shown. The panels comprising the first course are connected and tied together by means of two horizontal liners 11 through the instrumentality of the liner ties C, as before, the opposing courses being supported on stripping 25 resting on blocks 26 placed in the footing excavation. They are spaced apart in advance of filling by means of spreaders 27 and 28, the former being preferably located at the bottom edges of the section and the latter being cut away so as to fit over and between the top portions of the sections. The two opposing wall sections are clamped in position by means of a clamping device indicated as a whole at E and comprising a cross piece 29 and two legs 30 pivoted thereto and connected about midway of their length by means of the bolt 31 and the nut 32. The clamping device in effect constitutes a yoke, the length of which is approximately twice the height of the panels. The limbs of the clamping yoke take against the liners 11, as clearly illustrated in Figure 12.

The first courses are set up as illustrated in Figures 11 and 12, it being understood that several of the clamping yokes E are employed and located at suitable intervals. The concrete is then filled in, the footing being cast at the same time, after which the yokes E are removed by loosening the same one at a time and shifting them to the position shown in Figure 13, that is to say, they are raised with their lower ends supported on the upper liner 11 of the first course. The second course of panels is now set on top of the first course, the lower horizontal liner being removed from the first course and utilized to connect the panels of the second course. The two courses of panels are secured together by any preferred key means 33. It will be understood that the liner which has been removed from the lower course may be located at any desired elevation with respect to the second course and it will also be understood that the spacers are used at the top of the second course, as before, cooperating with the clamp yokes to position the second course.

After the second course has been filled with concrete, the clamping yokes are loosened one at a time, as before, and raised to the position indicated in Figure 14, that is to say with their lower ends bearing against the liner of the second course. The bottom course is now removed and is superimposed upon the second course to form the third course, being suitably keyed to the second course and having the opposing sections spread apart as before. The position of the parts as thus shifted is clearly shown in Figures 14 and 15, on inspection of which it will be seen that the form, considered as a whole, is supported from the concrete already cast. The third course is then filled and the operation can be continued to the extent required.

While I have shown liner ties of uniform length, it will be readily understood that liners of varying length may be utilized in lapped relation, for reasons fully pointed out.

It will be seen that by this arrangement of the liners and panels, in conjunction with an external clamping means, I am enabled to construct a wall with a minimum equipment. In Figures 11 and 15, I have illustrated the simplest form of this application of my invention but it will be readily understood that the operations can be carried out on a more extensive scale, such as diagrammatically shown for example in Figure 16.

It will be observed from inspection of this figure that I have carried forward the idea to the construction of a wall of considerable length by the utilization of a greater number of units which may be of the same or varying length and it will be noted that operations may thus be carried out very expeditiously on an extensive scale with but a minimum number of parts.

Another advantage of this arrangement is that the opposing wall section units need not be placed in direct opposition, that is to say, the joints in the panel units need not come opposite one another by reason of the fact that internal tie members, such as hereinbefore described, are not employed.

In shifting the panels of the first course above the second course, to form the third course, I prefer to remove the panels one at a time, to do which it is only necessary to move one liner and five keys so that the operation is very simple.

Furthermore if the form leans a little to one side, it can be readily pushed or pulled by hand to line as the concrete is being poured and when thus shifted, with the concrete filled in, it will not move of its own accord.

I claim:

1. In mold apparatus of the character described, the combination of a liner, a tie for securing the liner to an adjacent part of the mold apparatus having a portion for hooking to the mold apparatus detachable therefrom by movement of the tie relative thereto, and means for forcing the liner against the adjacent structure cooperating therewith to hold the tie fast thereto.

2. In mold apparatus of the character described, the combination of a liner, a securing tie therefor having a hooked portion adapted to hook on to an adjacent portion of the apparatus and a recess for the liner, and a key member cooperating with the tie to secure the liner to said portion of the apparatus.

3. In mold apparatus of the character described, the combination of a liner, a securing tie therefor having a portion adapted to hook on to an adjacent portion of the apparatus and a recess for the liner, and a securing member for the liner cooperating therewith to secure the tie to the mold structure.

4. In mold apparatus of the character described, the combination of a liner, a securing tie therefor with means for attaching the tie to a portion of the apparatus and an aperture for the liner, and means engageable in said aperture to prevent displacement of the liner when in proper position therein.

5. In mold apparatus of the character described, the combination of a liner, and a securing tie therefor with means for attaching the tie to an adjacent portion of the mold apparatus and a portion embracing the liner with a lateral opening for sidewise insertion or withdrawal thereof.

6. In mold apparatus of the character described, the combination of a mold section, a liner, and a liner tie having a hooked portion adapted to hook on to the mold section for support and a portion for embracing the liner.

7. A mold of the character described comprising in combination, a plurality of mold sections with apertured flanges, a liner, and a tie member having a hooked portion adapted to be passed through the apertures in the flanges and recessed to receive the liner.

8. A mold of the character described comprising in combination, a plurality of mold sections with apertured flanges, a liner, a tie member having a hooked portion adapted to be passed through the apertures in the flanges and recessed to receive the liner, and a member operating to wedge the liner against the mold sections and fix the position of the tie member relative to the flanges.

9. A mold of the character described comprising a flanged mold section, tie means detachably engaged with a mold section flange, and a mold section liner detachably engaged with the tie means and serving to hold the same away from the mold section web and maintain the engagement of the tie means with said flange.

10. A mold of the character described comprising a plurality of flanged mold sections, a liner therefor, a tie having a hook portion detachably engaged with juxtaposed flanges of such mold sections, and means for securing the liner to said sections cooperating with said liner to hold said tie away from the mold section webs and thereby maintain its hook portion aforesaid effectively interlocked with said flanges.

11. A mold of the character described comprising a flanged mold section, a tie having a portion engaged with a mold section flange detachable by sidewise movement of the tie and a portion with a lateral opening behind it, and a mold section liner engaged in said opening and detachable by sidewise movement in the direction of the mold section webs.

12. A mold of the character described comprising a flanged mold section, a tie having a portion engaged with a mold section flange detachable by sidewise movement of the tie and a portion with a lateral opening behind it, a mold section liner engaged in said opening and detachable by sidewise movement in the direction of the mold section webs, and key means for securing said liner in said opening cooperating with the liner to lock the first mentioned portion of the tie in engagement with the mold section flanges.

13. A mold of the character described comprising a plurality of flanged mold section, a liner for said mold sections, a tie with means for engaging the sections to fasten them together and a recess for said liner, and common means for concurrently tightening and securing said mold sections, liner, and tie all together.

14. A mold of the character described comprising a plurality of flanged mold sections; a liner for said mold sections; a single tie member with a portion for engaging and securing the sections together and a recess for said liner; and a single wedge cooperating with said tie to tighten and secure mold sections, tie, and liner all together.

15. In a mold apparatus of the character described, the combination of a plurality of liners, and means for detachably securing the liners together comprising a tie member shiftable along the liners and engageable with them in any relative positions, and means cooperating therewith to secure the liners in any relative positions.

16. A mold of the character described comprising in combination opposing mold units each composed of a plurality of mold sections, means for spacing the units laterally apart against movement toward each other, and liners detachably secured to sections independently of the spacing means and attachable thereto in any desired relative position.

17. In a mold apparatus of the character described, the combination of a vertical liner, a horizontal liner, and a tie for securing one of said liners to the other engageable with them in any desired relative positions.

18. A mold of the character described comprising in combination a plurality of mold sections adapted to be arranged in alinement and provided with means whereby a liner or liners may be detachably secured thereto at any desired elevations.

19. A mold of the character described comprising in combination a plurality of mold sections adapted to be arranged in alinement, horizontal liners and vertical liners, means for detachably securing certain of said liners to the sections, and means for securing other of the liners to liners secured to the sections engageable with both sets of liners in any relative positions.

20. A mold of the character described comprising a pair of opposing mold sections each consisting of a plurality of panels, a detachable liner means for each section, a yoke-like external supporting member straddling the sections and taking against the liner means whereby it is supported, said member having a length sufficient to permit of the introduction therein of a course of mold sections over said first sections while said member is supporting the latter.

21. A mold of the character described comprising opposing mold sections each consisting of a plurality of panels arranged horizontally, a detachable liner means for the panels of each section, a yoke-like external supporting member straddling the sections and taking against the liner means, said member having a length sufficient to permit of the introduction therein of a course of mold sections over said first sections while said member is supporting the latter.

22. A mold panel or liner tie comprising means engageable with one of the parts to be secured and a portion with a lateral opening behind it for receiving a liner sidewise by relative movement of the parts in the direction of the panel web.

23. A mold panel or liner tie comprising means engageable with one of the parts to be secured and a portion with a lateral opening behind it for receiving a liner sidewise by relative movement of the parts in the direction of the panel web, with common means for concurrently tightening and securing tie and liner to the other part to be secured.

24. A mold panel or liner tie comprising hook means engageable with one of the parts to be secured and a portion with a lateral opening behind it for receiving a liner sidewise by relative movement of the parts in the direction of the panel web, with means cooperating with said liner to draw the hook firm on the other part to be secured.

25. A mold panel or liner tie comprising a plate with a hook portion detachably engageable with one of the parts to be secured extending to one side thereof, and an opening in one edge thereof for receiving a liner sidewise by relative movement of the parts in the direction of the panel web.

26. A mold panel or liner tie comprising a plate with a hook portion detachably engageable with one of the parts to be secured extending to one side thereof, an opening in one edge thereof for receiving a liner sidewise by relative movement of the parts in the direction of the panel web, and a recess for a securing member at the side of said opening remote from the panel.

27. A tie for securing liners to flanged mold panels, comprising a plate with means for attaching it sidewise against a panel flange, and an opening in one edge thereof for receiving a liner sidewise by relative movement of the parts in the direction of the panel web.

28. A tie for securing liners to flanged mold panels, comprising a plate with means for attaching it sidewise against a panel flange, an opening in one edge thereof for receiving a liner sidewise by relative movement of the parts in the direction of the panel web, and a projection at one side of said opening for preventing sidewise withdrawal of the liner.

29. A tie for securing liners to flanged mold panels, comprising a plate with means for attaching it sidewise against a panel flange, an opening in one edge thereof for receiving a liner sidewise by relative movement of the parts in the direction of the panel web, and a projection at one side of said opening for preventing sidewise withdrawal of the liner, with means for forcing the liner against the panel behind said projection.

30. A tie for securing liners to flanged mold panels, comprising a plate with means for attaching it sidewise against a panel flange, an opening in one edge thereof for receiving a liner sidewise by relative movement of the parts in the direction of the panel web, a projection at one side of said opening for preventing sidewise withdrawal of the liner, and a recess for a securing member at the side of said opening opposite said projection.

31. A tie for securing liners to flanged mold panels, comprising a plate with hook means for attaching it sidewise against a panel flange, and an opening in one edge thereof for receiving a liner sidewise by relative movement of the parts in the direction of the panel web, with means for forcing the liner against the panel and thereby locking the hook to said panel flange.

32. A tie for securing liners to flanged mold panels, comprising a plate with hook means for attaching it sidewise against a panel flange, an opening in one edge thereof for receiving a liner sidewise by relative movement of the parts in the direction of the panel web, and a projection at one side of said opening for preventing sidewise withdrawal of the liner, with means for forcing the liner against the panel behind said projection, and thereby locking the hook to said panel flange and the liner in the tie.

In testimony whereof, I have hereunto signed my name.

WILLIAM M. VENABLE.